United States Patent [19]

House et al.

[11] Patent Number: 4,720,536
[45] Date of Patent: * Jan. 19, 1988

[54] BLENDS OF SECONDARY ALKYL AROMATIC DIAMINES AND POLYHYDRIC ALCOHOLS AS CURING AGENTS IN POLYURETHANE MANUFACTURE

[75] Inventors: David W. House, Arlington Heights; Ray V. Scott, Jr., Addison, both of Ill.

[73] Assignee: UOP Inc., Des Plaines, Ill.

[*] Notice: The portion of the term of this patent subsequent to Mar. 25, 2003 has been disclaimed.

[21] Appl. No.: 871,226

[22] Filed: Jun. 6, 1986

[51] Int. Cl.$^4$ .................. C08G 18/10; C08G 18/30; C09K 3/00

[52] U.S. Cl. .................................. 528/60; 528/64; 252/182

[58] Field of Search .............. 528/64, 60; 252/182

[56] References Cited

U.S. PATENT DOCUMENTS

| | | | |
|---|---|---|---|
| 3,846,351 | 11/1986 | Huffaker et al. | 524/52 |
| 3,891,606 | 6/1975 | Kogon | 528/64 |
| 3,939,123 | 2/1976 | Matthews et al. | 528/60 |
| 3,987,012 | 10/1976 | Statton | 528/64 |
| 3,997,514 | 12/1976 | Kogon | 528/64 |
| 4,440,901 | 4/1984 | Reiff et al. | 528/60 |
| 4,578,446 | 3/1986 | House et al. | 528/64 |

FOREIGN PATENT DOCUMENTS 673674  11/1963  Canada .................. 528/64

*Primary Examiner*—John Kight
*Assistant Examiner*—Dennis R. Daley
*Attorney, Agent, or Firm*—Thomas K. McBride; John F. Spears, Jr.; Eugene I. Snyder

[57] ABSTRACT

Urethane prepolymers cured with a blend of an aromatic alkyl diamine and a polyhydric alcohol having more than two hydroxyl groups show excellent compression set and tensile properties. Ratios of diamine to alcohol in the blend, expressed as equivalents, may vary from 1:1 to 19:1, with optimum properties in the elastomer often resulting from blends with the ratio 2:1 to 4:1.

30 Claims, No Drawings

BLENDS OF SECONDARY ALKYL AROMATIC DIAMINES AND POLYHYDRIC ALCOHOLS AS CURING AGENTS IN POLYURETHANE MANUFACTURE

BACKGROUND OF THE INVENTION

As a subclass of commercially available polymers, polyurethane elastomers have several properties whose advantages confer unique benefits on these products. Typically, polyurethanes show high abrasion resistance with high load bearing, excellent cut and tear resistance, high hardness, resistance to ozone degradation, yet are pourable and castable. Compared to metals, polyurethanes are lighter in weight, less noisy in use, show better wear and excellent corrosion resistance while being capable of cheap fabrication. Compared to other plastics, polyurethanes are non-brittle, much more resistant to abrasion, and exhibit good elastomeric memory. Polyurethanes find use in such diverse products as aircraft hitches, bushings, cams, gaskets, gravure rolls, star wheels, washers, scraper blades, impellers, gears, and drive wheels.

Part of the utility of polyurethanes derives from their enormous diversity of properties resulting from a relatively limited number of reactants. Typically, polyurethanes are prepared on site by curing urethane prepolymers, which are adducts of polyisocyanates and polyhydric compounds. A large class of such prepolymers are approximately 2:1 adducts of a diisocyanate, OCN—Y—NCO, and a diol, HO—Z—OH, whose resulting structure is OCN—Y—NHCO$_2$—Z—O$_2$CN-H—Y—NCO. Although Y is susceptible of great variety, usually being a divalent alkyl, cyclohexyl, or aromatic radical, in fact the most available prepolymers are made from toluene-2,4-diisocyanate (TDI) or methylene-4,4'-diphenyldiisocyanate (MDI). The diols used display a greater range of variety; Z may be a divalent alkyl radical (i.e., an alkylene group), and the diols frequently are ethers or esters which are the condensation products of glycols with alkylene oxides or dicarboxylic acids, respectively.

The polyurethane elastomers are formed by curing the urethane prepolymer. Curing is the reaction of the terminal isocyanate groups of the prepolymer with active hydrogens of a polyfunctional compound so as to form high polymers through chain extension and, in some cases, crosslinking. Diols, especially alkylene diols, are the most common curing agents for MDI-based urethane prepolymers, and representing such diols with the structure HO—X—OH, where X is an organic moiety, most usually an alkylene group, the resulting polymer has as its repeating unit,

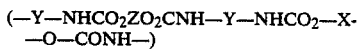

(—Y—NHCO$_2$ZO$_2$CNH—Y—NHCO$_2$—X-—O—CONH—)

Where a triol or a higher polyhydric alcohol is used crosslinking occurs to afford a nonlinear polymer.

Although other polyfunctional chemicals, especially diamines, are theoretically suitable, with but a few exceptions none have achieved commercial importance as a curing agent. The major exception is 4,4'-methylene-di-ortho-chloroaniline, usually referred to as MOCA, a curing agent which is both a chain extender and a crosslinker. TDI-based urethane prepolymers typically are cured with MOCA, and the resulting products account for perhaps most of the polyurethane elastomer market.

One reason that polyhydric alcohols generally have gained acceptance as curing agents is that their reaction with urethane prepolymers is sufficiently fast to be convenient, but not so fast as to make it difficult to work with the resulting polymer. In casting polymers it is desirable that the set-up time be reasonably short, yet long enough for the material to be cast into molds. This property is conventionally referred to as pot life. Generally speaking, diamines react with prepolymers, and especially MDI-based prepolymers, so quickly that they are not usable as curing agents. However, primary aromatic diamines with electronegative groups on the aromatic ring, or with alkyl groups ortho to the amino moiety, exhibit sufficiently decreased reactivities with some prepolymers as to afford a desirable pot life, hence the use of, for example, MOCA as a curing agent for TDI-based urethane prepolymers. However, MOCA and other of the aforementioned diamines still remain too reactive to be used, for example, with MDI-based urethane prepolymers.

Until recently only primary aromatic diamines seem to have been used as curing agents. Presumably this is because secondary diamines were expected to have an unacceptably long pot life, and because they could act only as chain extenders with urethane prepolymers in contrast to the crosslinking capabilities of primary diamines. However, we have found that certain N,N'-dialkyl-4,4'-methylenedianilines alone are generally effective curing agents for a broad range of urethane prepolymers; see U.S. Pat. No. 4,578,446. The resulting polyurethanes often have the advantage of being thermoplastic rather than thermosetting, thereby making them especially useful as coatings, adhesives, and sealants. The secondary aromatic diamines of that invention have commercially acceptable pot lives as curing agents for many prepolymers, and afford products with an impressive variety of properties.

The thermoplastic properties referred to above result from the alkyl aromatic diamines as curing agents being exclusively chain extenders. It appeared to us that where thermoplasticity was undesirable, blends of the aforementioned diamines and polyhydric alcohols which would give some measure of crosslinking would afford elastomers with desirable properties. In fact, we have found that such blends afford polyurethanes with substantially increased tear resistance and tensile strength and significantly decreased compression set. The resulting polyurethanes are quite desirable articles of commerce, and the use of blends containing alkyl aromatic secondary diamines significantly extends the scope of the latter as curing agents.

Huffaker et al., U.S. Pat. No. 3,846,351, previously have disclosed the use of N,N'-dialkylphenylene diamines in admixture with polyols as combination catalysts and chain extending agents in the one-shot preparation of polyurethanes. In that method polyurethanes do not result from the reaction of a urethane prepolymer with an amine or polyol, but rather from the reaction of an isocyanate itself with a polyol containing some amine. This distinction is important because of the well known differences in polyurethane obtained via the one-shot and urethane prepolymer methods. Additionally, the patentees recommended a mixture containing a minor amount of amine, from 0.01 to 50 parts by weight per 100 parts polyol, and taught preferably a mixture containing 0.5–5 parts by weight amine per 100 parts by weight polyol. The patentee used such blends with a small amount of a blowing agent to prepare flexible polyurethane foams whose tensile strength and tear resistance were in the range of 8–25 psi and 1.5–3 pli, respectively. In stark contradistinction, the polyurethanes resulting from this invention have a tensile strength 50–900 and a tear resistance 40–400 times greater than the patentees' products.

Moreover, the blends of this invention require a major amount of amine relative to polyol. The relative amounts of these components is best expressed in terms of their equivalent weight, and in this context, the ratio of amine to polyol is at least 1:1, or 50 percent on the basis of equivalent weight. The optimum set of properties is often obtained when the mixture contains 20–35% polyol, or 65–80% amine.

SUMMARY OF THE INVENTION

The purpose of this invention is to prepare polyurethanes by curing urethane prepolymers with a blend of alkyl aromatic secondary diamines and polyhydric alcohols which are at least trihydric. In an embodiment, the amines are N,N'-dialkyl-4,4'-methylenedianilines. In a more specific embodiment, the alkyl is a sec-butyl moiety. In another embodiment the blend contains no more than 50 percent equivalents of polyhydric alcohol. In yet another embodiment, the polyhydric alcohol constitutes about 20–35% equivalents of the blend. Other embodiments will be apparent from the following description.

DESCRIPTION OF THE INVENTION

The invention herein is the use of blends of alkyl aryl secondary diamines and polyhydric alcohols containing more than two reactive hydroxyl groups per molecule as curing agents for urethane prepolymers, and the polyurethane elastomers which result from such a curing blend.

The urethane prepolymers used in the practice of this invention are isocyanate-terminated adducts of a polyisocyanate and polyhydric alcohols. Prepolymers which are adducts of diisocyanates and dihydric alcohols, or diols, are the most commonly used prepolymers in commerce today and will be used to exemplify and illustrate urethane prepolymers generally. However, it is to be clearly understood that this invention is applicable to urethane prepolymers generally, and should not be restricted to those prepolymers arising from diisocyanates and diols. As examples of such polyisocyanates may be cited, the toluene diisocyanates, p- and m-phenylene diisocyanate, tetramethylene diisocyanate, 1,6-hexamethylene diisocyanate, 1,4-cyclohexylene diisocyanate, 4,4'-methylene dicyclohexyl diisocyanate, 4,4'-diphenylmethane diisocyanate, 1,5-napthalene diisocyanate, and 1,5-tetrahydronaphthalene diisocyanate. As stated previously, TDI and MDI are currently the preferred diisocyanates in urethane prepolymers.

Among the diols frequently used in making urethane prepolymers are alkylene diols, such as ethylene glycol, 1,3-propylenediol, 1,4-butylenediol, and so forth. Diolethers and diolesters find widespread use in making urethane prepolymers. The diolethers, as exemplified by poly(alkyleneoxy)diols, are typically condensation products of alkylene oxides with glycols or water, with the number of alkyleneoxy groups in the molecule generally increasing as the ratio of oxide to glycol increases. Examples of glycols include ethylene glycol, propylene glycol and butylene glycol, and exemplary of the alkylene oxides are ethylene oxide, propylene oxide, butylene oxide, amylene oxide, and tetrahydrofuran.

The diolesters often are esters of dicarboxylic acids and diols, especially the glycols previously exemplified. Most typically, such products are esters of linear or aromatic dicarboxylic acids, such as succinic, glutaric, adipic, pimelic, suberic, azelaic, sebacic, phthalic, terephthalic, isophthalic acids, and so on. But it needs to be stressed again that the structures cited above are merely illustrative and exemplary of the diisocyanates and diols which may be used in making a urethane prepolymer, and are not intended to be exhaustive.

The ratio of reactants used in preparing the prepolymer is generally expressed in terms of relative numbers of isocyanate and hydroxyl groups, respectively. In this context, an equivalent amount of isocyanate and diol contains an equal number of isocyanate and hydroxyl groups. The prepolymer may contain from about 1.5 to about 4.0 equivalents of diisocyanate relative to diol, but most commonly there are about 2 equivalents diisocyanate per diol.

The polyurethane elastomer is made by reacting the prepolymer with a blend containing at least one secondary aromatic alkyl diamine of the structure,

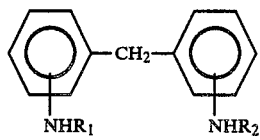

Each alkyl group, R, contains from 1 up to about 20 carbon atoms. Alkyl groups containing from 1 to 10 carbon atoms, and especially from 4 to about 8 carbon atoms, are particularly preferred. The alkyl group may be a primary, secondary, or tertiary alkyl group, although when the alkyl is tertiary there is the risk that cure time may be too long to be commercially acceptable. Secondary alkyl groups are preferred, and among these the secondary butyl group is particularly preferred. Of the positional isomers possible the 4,4'-methylenedianilines are most desirable.

The other major component of the curing blend is a polyhydric alcohol, or polyol. The secondary aromatic diamines used in curing act as chain extenders only, since each amino group has but one hydrogen and there are only two amino groups per molecule. The purpose of the polyhydric alcohol in the blend is to act as a crosslinking agent. Consequently, the polyhydric alcohols used in this invention must have more than two reactive hydroxyl groups per molecule, i.e., more than two hydroxyl groups per molecule must react with the terminal isocyanate groups of the urethane prepolymer. Normally, this means the polyols are at least trihydric, but since some trihydric alcohols may have one or more hydroxyl groups unreactive under the reaction conditions of curing, it is not invariably true that a trihydric alcohol will suffice. In particular, phenolic hydroxyl moieties, and hydroxyl groups attached to a tertiary carbon atom, usually will be unreactive in curing urethane prepolymers, whereas the hydroxyl moiety associated with primary and secondary alcohols will be reactive.

An equivalent of diamine or polyhydric alcohol may be defined as an amount which furnishes as many hydrogen atoms from the amino groups or from the reactive hydroxyl groups as there are isocyanate groups in the urethane prepolymer. In this context, an amount of the curing blend containing from about 0.80 to about 1.2 equivalents is used in curing, with the range from about 0.85 to about 1.1 being the more usual one. Within the blend, the ratio of equivalents of diamine to polyhydric alcohol is from about 1:1 to about 19:1, with the range from about 1.5:1 to about 6:1 being preferred. For a number of urethane prepolymer-curing blend systems optimum properties seem to result using a blend containing a ratio of equivalents of diamine to alcohol from about 2:1 to about 4:1. Stated somewhat differently, in terms of overall percent equivalents, the blends herein contain from about 5 to about 50 percent of polyhydric alcohol, more usually from about 15 to about 40 percent, with the optimum containing from about 20 to about 35 percent alcohol.

The curing blends also may contain other materials normally added to, and found in, the polyurethane product. Thus, such materials as plasticizers, colorants, flame retardants, mold release agents, ultraviolent inhibitors, and fillers may be present in minor amounts in the curing blend. It is to be understood that such additives do not partake of the curing reaction and are not part of the curing process, but instead impart useful properties to the polyurethane or are beneficial during processing of the elastomer. In any event, such additives are well know to those practicing this art and will not be further discussed.

The initial reaction between the urethane prepolymer and the curing blend is between about 75° and about 120° C. The temperature is chosen, in part, to afford a convenient pot life, that is, the time interval from mixing the blend and urethane prepolymer until the mixture is very difficult to pour. The elastomer is then cured to a tack-free state by heating at the same temperature range for an additional period from about 2 to about 24 hours.

The following examples are merely illustrative of this invention which is not to be limited thereto. In particular, the use of any particular diamine or polyhydric alcohol, or any particular blend of the two, is to be construed only as representative of the diamine, polyhydric alcohol, and their blends as curing agents in this invention. In polymer characterizations several ASTM tests were used as follows: hardness, D2240, types A and D; tear resistance, D624, die C; tensile strength, D412, die C; modulus D412, die C; elongation at break, D412, die C; compression set, D395, method B.

EXAMPLES

In all the blends N,N'-di(2-butyl)-4,4'-methylenedianiline was used as the diamine in a representative capacity only. Where the diamine and the polyhydric alcohol were mutually miscible or soluble, a suitable blend was made by mixing the two components, with heating if necessary, to obtain a homogeneous mixture. Where the diamine and alcohol were not mutually miscible or soluble, a suspension of the alcohol, usually as its melt, was prepared in the diamine. The polyols used in the study reported below were 1,1,1-tri(hydroxymethyl)propane (TMP), otherwise known as 2,2-di(hydroxymethyl)-1-butanol, N,N,N',N'-tetrakis(2-hydroxypropyl)ethylene diamine(Q), and 2,4,6-tris(N-methyl-N-hydroxymethylaminomethyl)-phenol (T).

The urethane prepolymers used in the study whose results are summarized below were a TDI-ether product with 6.25% terminal isocyanate groups, obtained from Conap, Inc., (A), and a TDI-ester product with 6.56% terminal isocyanate groups, obtained from American Cyanamid Corp., (B). It needs to be emphasized again that the materials used (diamine, polyhydric alcohol, and urethane prepolymer) in the study reported below are merely representative of the materials which may be used in the practice of this invention.

The curing agent blends were allowed to react with the commercial prepolymers using typical hand-batching techniques to prepare polymers, which then were stirred using a high-torque stirrer and cast into ASTM steel casting molds with cover plates. The mixing temperature was 100° C., and the curing period was 17 hours at the same temperature. At the end of this period the molds were removed from the oven and cooled to room temperature. The cooled polymers were removed and post-cured for 2 weeks at ambient temperature before testing. All polymers were light amber in color and were transparent.

Table 1 summarizes some characteristics of the blend, its pot life, and the physical description of the resulting polymer. Table 2 summarizes some of the physical properties of resulting polyurethanes. Examination of Table 2 shows that as the blend is changed from pure diamine to pure polyhydric alcohol the compression set is continually decreased. On the other hand, the tensile strength and tear resistance first increases, and then decreases. The optimum appears to be at levels of polyhydric alcohol between about 20 and about 35 percent, on an equivalents basis.

TABLE 1

Diamine-Alcohol Blends as Curing Agents

| Prepolym | Alcohol | Ratio Amine | Ratio Alcohol | Funct$^a$ | Stoich$^b$ % | pph$^c$ Amine | pph$^c$ Alcohol | Pot Life Min | Description |
|---|---|---|---|---|---|---|---|---|---|
| A | —   | 100 | 0   | 2.01 | 96 | 22.2 | —    | 48  | amber |
|   | TMP | 80  | 20  | 2.21 | 96 | 17.6 | 1.27 | >45 | pale amber |
|   | TMP | 75  | 25  | 2.26 | 95 | 16.6 | 1.58 | >45 | pale amber |
|   | TMP | 67  | 33  | 2.34 | 95 | 14.7 | 2.08 | >45 | pale amber |
|   | TMP | 50  | 50  | 2.51 | 94 | 10.8 | 3.12 | >45 | pale amber |
|   | TMP | 0   | 100 | 3    | 89 | —    | 5.93 | >45 | v pale amber |
| A | —   | 100 | 0   | 2.01 | 96 | 22.2 | —    | 48  | amber |
|   | T   | 80  | 20  | 2.21 | 95 | 17.5 | 3    | 16  | light amber |
|   | T   | 75  | 25  | 2.26 | 95 | 16.4 | 3.7  | 14  | light amber |
|   | T   | 67  | 33  | 2.34 | 94 | 14.6 | 4.9  | 10  | light amber |
|   | T   | 50  | 50  | 2.51 | 96 | 11   | 7.5  | 5   | light amber |
|   | T   | 0   | 100 | 3    | 91 | —    | 14.4 | 4   | pale yellow |
| A | —   | 100 | 0   | 2.01 | 96 | 22.2 | —    | 48  | amber |
|   | Q   | 80  | 20  | 2.41 | 95 | 17.6 | 2.1  | 18  | light amber |
|   | Q   | 75  | 25  | 2.51 | 94 | 16.3 | 2.6  | 14  | light amber |
|   | Q   | 67  | 33  | 2.67 | 95 | 14.6 | 3.4  | 12  | light amber |

TABLE 1-continued

Diamine-Alcohol Blends as Curing Agents

| Prepolym | Alcohol | Ratio Amine | Ratio Alcohol | Funct[a] | Stoich[b] % | pph[c] Amine | pph[c] Alcohol | Pot Life Min | Description |
|---|---|---|---|---|---|---|---|---|---|
| | Q | 50 | 50 | 3.01 | 94 | 18.8 | 5.1 | 7 | light amber |
| | Q | 0 | 100 | 4 | 92 | — | 9.98 | 2 | v pale yellow |
| B | — | 100 | 0 | 2.01 | 96 | 23.2 | — | 23 | amber |
| | TMP | 80 | 20 | 2.21 | 95 | 18.4 | 1.33 | 10 | light amber |
| | TMP | 75 | 25 | 2.26 | 94 | 17.1 | 1.64 | 8 | light amber |
| | TMP | 67 | 33 | 2.34 | 95 | 15.4 | 2.18 | 6 | light amber |
| | TMP | 50 | 50 | 2.51 | 95 | 11.5 | 3.31 | 6 | light amber |
| | TMP | 0 | 100 | 3 | 92 | — | 6.42 | 5 | colorless |
| B | — | 100 | 0 | 2.01 | 96 | 23.2 | — | 23 | amber |
| | T | 80 | 20 | 2.21 | 94 | 18.3 | 3.11 | 10 | light amber |
| | T | 75 | 25 | 2.26 | 95 | 17.2 | 3.93 | 7 | light amber |
| | T | 67 | 33 | 2.34 | 94 | 15.2 | 5.1 | 4 | light amber |
| | T | 50 | 50 | 2.51 | 94 | 11.4 | 7.79 | 4 | light amber |
| | T | 0 | 100 | 3 | 89 | — | 14.8 | <1 | yellow |
| B | — | 100 | 0 | 2.01 | 96 | 23.2 | — | 23 [c] | amber |
| | Q | 80 | 20 | 2.41 | 95 | 18.4 | 2.17 | 7 | light amber |
| | Q | 75 | 25 | 2.51 | 95 | 17.3 | 2.71 | 4 | light amber |
| | Q | 67 | 33 | 2.67 | 95 | 15.4 | 3.6 | 2 | light amber |
| | Q | 50 | 50 | 3.01 | 95 | 11.5 | 5.4 | 1.5 | light amber |
| | Q | 0 | 100 | 4 | 94 | — | 10.7 | <1 | pale yellow |

[a]Func, or functionality, is the average number of —NH and reactive —OH groups per molecule in blend.
[b]Stoich, or stoichiometry, is the fraction of curing agent equivalents used per equivalent of prepolymer, expressed as percent.
[c]Weight in parts per hundredweight of prepolymer.

TABLE 2

Physical Properties of Polyurethanes Using a Diamine-Polyhydric Alcohol Curing Blend

| Prepolym | Alcohol | Ratio Amine | Ratio Alcohol | Funct | Shore A | Shore D | Tear pli | Tensile psi | Modulus 100% | Modulus 200% | Modulus 300% | Elong % | CompSet % |
|---|---|---|---|---|---|---|---|---|---|---|---|---|---|
| A | — | 100 | 0 | 2.01 | 64 | 19 | 143 | 2448 | 228 | 293 | 381 | 521 | 82 |
| | TMP | 80 | 20 | 2.21 | 65 | 19 | 126 | 3204 | 258 | 389 | 639 | 421 | 49 |
| | TMP | 75 | 25 | 2.26 | 65 | 19 | 135 | 3988 | 266 | 415 | 717 | 413 | 43 |
| | TMP | 67 | 33 | 2.34 | 66 | 20 | 137 | 4573 | 288 | 466 | 930 | 382 | 37 |
| | TMP | 50 | 50 | 2.51 | 67 | 21 | 144 | 3140 | 333 | 571 | 1361 | 346 | 26 |
| | TMP | 0 | 100 | 3 | 67 | 24 | 116 | 1128 | 436 | 1100 | | 206 | 21 |
| A | — | 100 | 0 | 2.01 | 64 | 19 | 143 | 2448 | 228 | 293 | 381 | 521 | 82 |
| | T | 80 | 20 | 2.21 | 63 | 18 | 131 | 2734 | 247 | 376 | 620 | 425 | 40 |
| | T | 75 | 25 | 2.26 | 63 | 18 | 131 | 2912 | 239 | 380 | 678 | 404 | 35 |
| | T | 67 | 33 | 2.34 | 64 | 18 | 124 | 2360 | 239 | 411 | 821 | 375 | 25 |
| | T | 50 | 50 | 2.51 | 64 | 18 | 128 | 1585 | 299 | 607 | 1585 | 300 | 14 |
| | T | 0 | 100 | 3 | 69 | 22 | 93 | 599 | 416 | | | 132 | 4.4 |
| A | — | 100 | 0 | 2.01 | 64 | 19 | 143 | 2448 | 228 | 293 | 381 | 521 | 82 |
| | Q | 80 | 20 | 2.41 | 62 | 18 | 127 | 4159 | 257 | 397 | 700 | 400 | 42 |
| | Q | 75 | 25 | 2.51 | 64 | 20 | 136 | 3602 | 298 | 457 | 911 | 381 | 37 |
| | Q | 67 | 33 | 2.67 | 65 | 21 | 146 | 4229 | 266 | 509 | 1271 | 350 | 23 |
| | Q | 50 | 50 | 3.01 | 67 | 23 | 138 | 2300 | 354 | 693 | 2300 | 300 | 14 |
| | Q | 0 | 100 | 4 | 71 | 26 | 96 | 570 | 518 | | | 119 | |
| B | — | 100 | 0 | 2.01 | 97 | 62 | 530 | 6303 | 1068 | 1499 | 2579 | 500 | 89 |
| | TMP | 80 | 20 | 2.21 | 97 | 57 | 547 | 7167 | 1176 | 1762 | 3108 | 450 | 60 |
| | TMP | 75 | 25 | 2.26 | 97 | 57 | 521 | 7408 | 1188 | 1753 | 3376 | 425 | 60 |
| | TMP | 67 | 33 | 2.34 | 97 | 57 | 501 | 7545 | 1245 | 1857 | 3660 | 400 | 44 |
| | TMP | 50 | 50 | 2.51 | 96 | 55 | 479 | 6723 | 1143 | 1876 | 4282 | 363 | 28 |
| | TMP | 0 | 100 | 3 | 97 | 55 | 273 | 6329 | 877 | 2100 | | 282 | 12 |
| B | — | 100 | 0 | 2.01 | 97 | 62 | 530 | 6303 | 1068 | 1499 | 2579 | 500 | 89 |
| | T | 80 | 20 | 2.21 | 98 | 58 | 553 | 7367 | 1184 | 1753 | 3375 | 413 | 39 |
| | T | 75 | 25 | 2.26 | 98 | 58 | 535 | 7700 | 1166 | 1785 | 3600 | 419 | 34 |
| | T | 67 | 33 | 2.34 | 98 | 58 | 501 | 6143 | 1007 | 1517 | 3043 | 375 | 20 |
| | T | 50 | 50 | 2.51 | 98 | 58 | 440 | 6077 | 1146 | 1967 | 4926 | 325 | 14 |
| | T | 0 | 100 | 3 | 97 | 55 | | | | | | | 2.5 |
| B | — | 100 | 0 | 2.01 | 97 | 62 | 530 | 6303 | 1068 | 1499 | 2579 | 500 | 89 |
| | Q | 80 | 20 | 2.41 | 97 | 58 | 582 | 7862 | 1311 | 2019 | 3951 | 394 | 28 |
| | Q | 75 | 25 | 2.51 | 98 | 58 | 593 | 5705 | 1328 | 2082 | 4255 | 329 | 23 |
| | Q | 67 | 33 | 2.67 | 97 | 58 | 569 | 5995 | 1518 | 2470 | 5140 | 313 | 15 |
| | Q | 50 | 50 | 3.01 | 97 | 58 | 498 | 4556 | 1526 | 2646 | | 254 | 9.2 |
| | Q | 0 | 100 | 4 | 97 | 55 | | | | | | | |

What is claimed is:

1. A method of curing a polyurethane prepolymer comprising reacting an isocyanate terminated urethane prepolymer, said prepolymer being the adduct of from about 1.5 to about 4.0 equivalents of a polyisocyanate with one equivalent of a polyol, with from about 0.80 to about 1.2 equivalent of a blend comprising a secondary aromatic diamine of the structure,

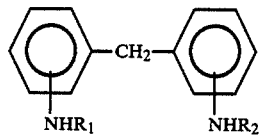

where each of the alkyl groups $R_1$ and $R_2$ contains from 1 to about 20 carbon atoms, and a polyhydric alcohol containing more than two reactive hydroxyl groups per molecule, said blend containing from about 1 to about 19 equivalents amine per equivalent polyhydric alcohol, at a temperature between about 75° C. and about 120° C., and recovering the cured polyurethane resulting therefrom.

2. The method of claim 1 where the prepolymer is an adduct of a diisocyanate and a dihydric alcohol.

3. The method of claim 2 where the diisocyanate is toluene diisocyanate or methylenediphenyl diisocyanate.

4. The method of claim 1 where the alkyl group contains from 1 to about 10 carbon atoms.

5. The method of claim 4 where the alkyl group contains from 4 to 8 carbon atoms.

6. The method of claim 1 where the alkyl is a secondary alkyl moiety.

7. The method of claim 1 where the alkyl group is the 2-butyl group.

8. The method of claim 1 where the diamine is a N,N'-dialkylmethylene-4,4'-dianiline.

9. The method of claim 8 where the diamine is N,N'-di(2-butyl)-methylene-4,4'-dianiline.

10. The method of claim 1 where the polyhydric alcohol is selected from the group consisting of 2,2-di(hydroxymethyl)-1-butanol, N,N,N',N'-tetrakis(2-hydroxypropyl)ethylene diamine, and 2,4,6-tris(N-methyl-N-hydroxymethylaminomethyl)phenol.

11. A polyurethane resulting from the reaction of an isocyanate terminated urethane prepolymer, said prepolymer being the adduct of from about 1.5 to about 4.0 equivalents of a polyisocyanate with one equivalent of a polyol, with from about 0.80 to about 1.2 equivalent of a blend of a secondary aromatic diamine of the structure,

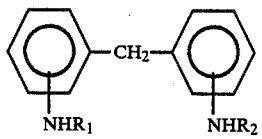

where each of the alkyl groups $R_1$ and $R_2$ contains from 1 to about 20 carbon atoms, and a polyhydric alcohol containing more than two reactive hydroxy groups per molecule, said blend containing from about 1 to about 19 equivalents amine pre equivalent polyhydric alcohol.

12. The polyurethane of claim 11 where the prepolymer is an adduct of a diisocyanate and a dihydric alcohol.

13. The polyurethane of claim 12 where the diisocyanate is toluene diisocyanate or methylenediphenyl diisocyanate.

14. The polyurethane of claim 11 where the alkyl group contains from 1 to about 10 carbon atoms.

15. The polyurethane of claim 14 where the alkyl group contains from 4 to 8 carbon atoms.

16. The polyurethane of claim 11 where the alkyl group is a secondary alkyl moiety.

17. The polyurethane of claim 11 where the alkyl group is the 2-butyl group.

18. The polyurethane of claim 11 where the diamine is a N,N'-dialkylmethylene-4,4'-dianiline.

19. The polyurethane of claim 18 where the diamine is a N,N'-di(2-butyl)-methylene-4,4'-dianiline.

20. The polyurethane of claim 11 where the polyhydric alcohol is selected from the group consisting of 2,2-di(hydroxymethyl)-1-butanol, N,N,N',N'-tetrakis(2-hydroxypropyl)ethylene diamine, and 2,4,6-tris(N-methyl-N-hydroxymethylaminomethyl)phenol.

21. A blend for curing urethane prepolymers comprising a secondary aromatic diamine of the structure,

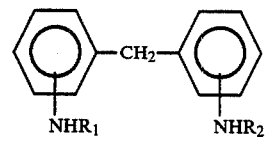

where each of the alkyl groups $R_1$ and $R_2$ contains from 1 to about 20 carbon atoms, and a polyhydric alcohol containing more than two reactive hydroxyl groups per molecule, the ratio of equivalents of amine to alcohol being from about 1:1 to about 19:1.

22. The blend of claim 21 where the alkyl group contains from 1 to about 10 carbon atoms.

23. The blend of claim 22 where the alkyl group contains from 4 to 8 carbon atoms.

24. The blend of claim 21 where the alkyl is a secondary alkyl moiety.

25. The blend of claim 21 where the alkyl group is the 2-butyl group.

26. The blend of claim 21 where the diamine is a N,N'-dialkylmethylene-4,4'-dianiline.

27. The blend of claim 21 where the diamine is N,N'-di(2-butyl)-methylene-4,4'-dianiline.

28. The blend of claim 21 where the polyhydric alcohol is selected from the group consisting of 2,2-di(hydroxymethyl)-1-butanol, N,N,N',N'-tetrakis(2-hydroxypropyl)ethylene diamine, and 2,4,6-tris(N-methyl-N-hydroxymethylaminomethyl)phenol.

29. The blend of claim 21 where the ratio is from about 1.5:1 to about 6:1.

30. The blend of claim 29 where the ratio is from about 2:1 to about 4:1.

* * * * *